Figure 1:
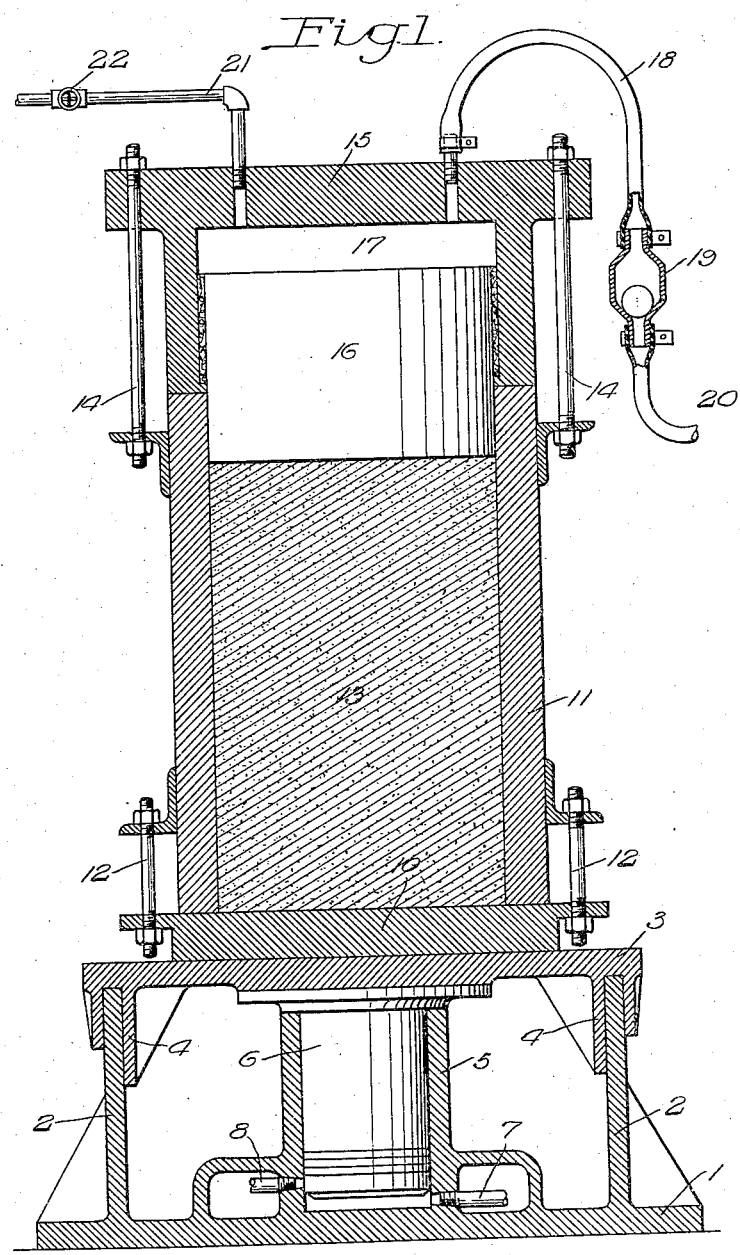

Patented Aug. 11, 1931

1,818,234

UNITED STATES PATENT OFFICE

SEMMEON M. McANULTY, OF NIAGARA FALLS, NEW YORK, ASSIGNOR TO REPUBLIC CARBON COMPANY, OF NIAGARA FALLS, NEW YORK, A CORPORATION OF NEW YORK

MOLDING GRANULAR MIXTURES

Application filed September 7, 1929. Serial No. 390,949.

The present invention relates to the molding of granular mixtures, and more especially to an apparatus and method for molding a granular mix in a jolted mold.

In the patent to Victor C. Doerschuk, No. 1,683,587, dated September 4, 1928, there is described and claimed a method of consolidating granular mixes by placing the mix in a mold and jarring the mold, and especially a method of making carbon electrodes by such procedure. As described in the Doerschuk patent, the granular mix containing the ground carbonaceous material and the binder was placed in a mold which was jarred or jolted to pack and consolidate the mix in the mold. As described in the Doerschuk patent, a heavy weight was placed upon the top of the mix in the mold to confine the mixture and assist in its consolidation.

As shown in the Doerschuk patent, pivoted follower cams were provided for holding down the weight. Because of their rotational inertia, these cams were not able to instantaneously follow the quick downward movement of the weight when the mold was suddenly arrested. The cams therefore were unable to prevent some rebound of the follower and the contents of the mold.

The present invention is an improvement over the Doerschuk device. I replace the weight and non-instantaneous cam system of Doerschuk by a follower which is instantaneous in action and which positively prevents rebound of the follower and contents of the mold after the follower has moved downwardly when the downward movement of the mold is suddenly arrested by the jarring device. The follower which I prefer to use is a hydraulic follower connected with a suitable source of hydraulic pressure through a quick acting check valve. The granular mix is placed in the mold and jarred, as in the Doerschuk patent. The inertia of the mix and the follower when the downward movement of the mold is suddenly arrested serves to pack the material. When the downward movement of the mold is suddenly arrested there is an instant in which the inertia of the material and the weight cause the weight to move downwardly, followed by a tendency of the material and the weight to rebound. The hydraulic pressure follows the plunger or weight downwardly and the check valve acts instantaneously to prevent any upward rebound or yield of the plunger. The result is that the material may be compacted to a density not obtainable in the Doerschuk device.

While I prefer to use a hydraulic follower, other forms of follower may be used such, for example, as instantaneously operating clutches which can follow the quick but small downward movement of the plunger when the mold is arrested and instantaneously prevent its tendency to rebound.

The most desirable type of compacting device is believed to be one in which the follower is at all times forced by a strong positive pressure against the material being compacted rather than being dependent solely upon gravity as in Doerschuk's device where during the time the mold and its contents are in motion downward the pressure of the weight against the upper surface of the mix is materially reduced. It is particularly desirable that the means intended to check the rebound be thus positively actuated so that the tendency of the follower to rebound shall be instantly prevented at the moment the mix is under maximum compression.

Figure 2:
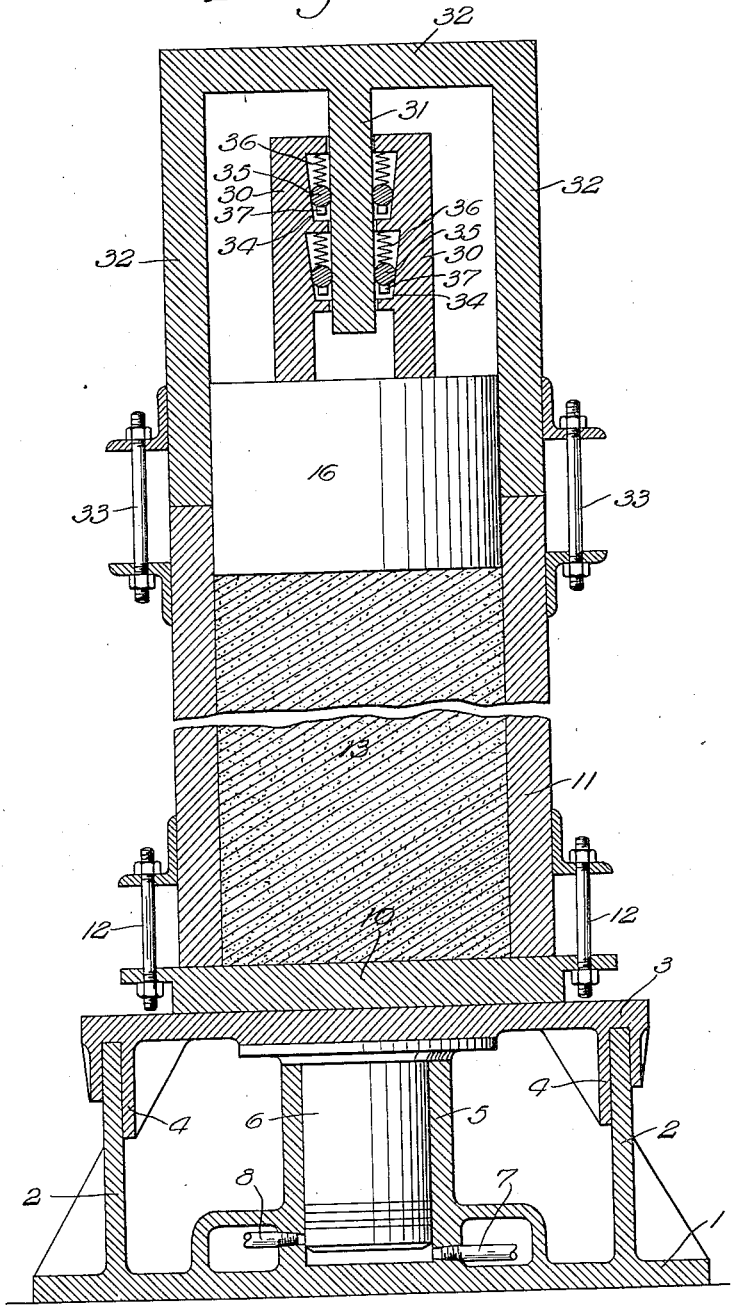

In the drawings, Figure 1 is a sectional view of a jolting device embodying my invention and having a hydraulic follower, and Figure 2 is a sectional view of a modification using a mechanical clutch.

Referring to the embodiment of the invention illustrated in Figure 1, the jarring or jolting machine comprises a base 1 having sides 2 and a table 3 provided with downwardly extending guides 4 which telescopically receive the upper end of the sides 2. The base is provided centrally with a cylinder 5 which receives a piston 6 attached to the table 3. For raising the table, a fluid under pressure is supplied to the cylinder 5 through a pipe 7, and to permit the table to fall and jolt the mold the fluid is exhausted from the cylinder through a pipe 8.

The mold resting upon the table 3 comprises a base 10 and a vertical barrel 11 which may be attached to the base by bolts 12, as shown. The granular mix being molded is indicated by reference numeral 13. Supported upon the top of the mold and firmly held against it by means of bolts 14 is a hydraulic head, designated generally by reference numeral 15, which comprises a ram or follower 16 moving telescopically in the chamber 17 and extending into the upper part of the mold. A fluid under pressure is supplied to the chamber 17, as desired, through the pipe 18 provided with a check valve 19 designed to permit the fluid to flow toward the chamber 17 but not in the reverse direction. Any suitable form of check valve may be used. The pipe 20 leads to a suitable source of fluid pressure, such as water pressure, not shown. A pipe 21, normally closed by a valve 22, is provided so that the fluid may be drawn from the chamber 17 after the conclusion of the molding operation.

While my apparatus and method is suitable for the molding of any unconsolidated granular or plastic mixture, I shall, for purposes of illustration, describe the molding of a carbon electrode. In making an electrode a mixture composed, for example, of about 40 parts baked electrode scrap ground to pass a one inch screen, about 40 parts calcined anthracite coal flour ground so that 60% of it will pass through a 200 mesh screen, and approximately 30 parts of a suitable binder, such as pitch, is placed in the mold after having been thoroughly worked together and heated. The top of the mold is left open and the material is run into the mold which is jolted so as to cause a preliminary settling of the material to take place and remove most of the entrapped air from the mixture.

After the mold is filled and the preliminary settling is accomplished, the hydraulic head 15 is applied to the top of the mold and water or oil under pressure is admitted to the chamber 17. The mold is then jolted by means of the cylinder and piston arrangement 5 and 6, and the jolting continued until such time as no further increase in density is secured in the compacted mixture by further jolting. Water has the advantage of being cheap and readily available from the usual city supply mains under sufficient pressure. Oil has the advantage that leakage into the mold does not harm articles such as electrodes, whereas water is injurious.

The term "hydraulic" follower is intended as a term of general description and not of limitation and is intended to include followers operated by oil, water or other fluids.

As the mold with its charge is dropped and suddenly brought to a standstill, the inertia of the mix 13, together with the inertia of the ram 16, tends to pack the material. As the material settles under its inertia and the ram 16 follows the material down, the fluid under pressure passes the check valve 19 into the chamber 17. Immediately after the mold is brought to a standstill there is a tendency of the material and ram to rebound. This tendency is, however, prevented by the water which has flown past the check valve and which cannot escape. The check valve is substantially instantaneous in operation and causes the hydraulic follower to catch the plunger at the bottom of its downward movement under its inertia and prevent any rebound. The operation is repeated over and over again, the ram following the downward packing of the material and never yielding under the tendency of the material to rebound. The operation is continued until practically all of the air is displaced from between the particles of the mix so that an extremely dense body is obtained.

While increasingly great densities are obtainable as the hydraulic pressure behind the ram is increased, I find that even relatively low water pressures, such as those normally secured from city water systems, are sufficient when used with my device to yield a product having materially greater density than otherwise produced by jolting, even with an extremely heavy weight above the mixture, or by any other means of which I am aware. This increased density is advantageous in that it greatly improves the ability of the electrode to withstand the various destructive influences to which it is subjected in service. It also increases the conductivity somewhat, as well as the physical strength of the material. It also tends to reduce the waste of the electrode in use. The advantages of my process become quite apparent after the electrode has been removed from the mold and baked as in the usual process of making electrodes. For purposes of comparison, in using an electrode mixture substantially as given above, and forming an electrode by the usual extrusion process in which the mix is extruded through a die at a pressure of approximately 5,000 pounds per square inch, electrodes were made having densities of from 1.47 to 1.51 times that of water, and an average transverse breaking test of 1220 pounds per square inch. In using the same mixture and jolting it in a mold having a heavy weight as in the Doerschuk process, densities of from 1.51 to 1.57 and an average transverse breaking test of 1130 pounds per square inch are secured. In using the same mix, but with my hydraulic follower applied to the mold during the jolting, I secured densities from 1.59 to 1.64 and even higher, and an average transverse breaking test of 1465 pounds per square inch.

It will be noted that while the density of the electrode as made by the Doerschuk process is greater than that of the extruded material, the strength of the former is less than that of the extruded product. In explanation of this fact the following explanation is advanced, although the validity of such explanation is not an essential part of my invention. Extrusion through a die tends to break down some of the larger particles more than does the jolting operation, resulting in a finer grained body, such bodies being characteristically somewhat stronger than coarser ones. Further as the jolting causes lamination of the article perpendicular to the direction of jolting, there may be a tendency for breakage to follow the planes between laminæ at which points less force is required to cause fracture. In any case, the difference noted seems characteristic and it will be noted that further increase in density and the highest strength of all were secured by utilization of my improved method of forming. This, I explain as being due to compacting of the laminæ to such an extent that the adhesion between them is so great as to materially increase the strength of the article.

In Figure 2 is illustrated a modification in which a so-called Horton clutch is used as the device for following the downward movement of the plunger and preventing any rebound. As illustrated, the clutch consists of a head 30 carried on the plunger 16 and receiving a bar 31. The bar 31 projects downwardly from a yoke 32 held on the mold 11 by suitable clamping bolts 33. The bar 31 is of hardened steel and is of square or rectangular cross section having smooth sides. The head 30 has internally inclined hardened wedge faces 34. Between the faces of the bar 31 and the inclined faces 34 are placed hardened steel rollers 35. The rollers 35 will be naturally held downwardly by gravity, although springs 36 may be used to additionally urge them downward. This type of clutch is commonly known as the "Horton" clutch. The operation of the clutch is as follows.

The wedging rollers 35 permit the head 30 to move downwardly with respect to the bar 31 but prevent upward movement with respect thereto. When the downward movement of the mold and its attached parts is suddenly arrested by contact with the sides 2, the mix 13 which is being consolidated and the plunger 16 and head 30 continue to move downwardly because of their inertia, and the head 30 will move downwardly slightly with respect to the rigidly supported bar 31. The inertia of the rollers 35 will also tend to move them downwardly into tight wedging engagement between the inclined surfaces 34 and the face of the bar 31 so that they will instantaneously lock the head 30 and prevent any upward rebound of the head 30 and plunger 16.

The jarring is continued as above described until the mix 13 is consolidated. The yoke 32 may be then removed and the follower taken out. If desirable, movable stop fingers 37 may be provided for holding the rollers 35 in inoperative position.

While the hydraulic follower or "Horton" clutch are preferred as the instantaneously acting devices for positively preventing rebound of the plunger, other instantaneously acting followers may be employed.

While the invention has been particularly described in its application to the consolidation of carbon electrodes, it may be used for consolidating the mixes used in the production of abrasive bodies, refractories, crucibles, etc., from ceramic or other moldable mixtures. The high density obtainable by my process of jolting permits the production of refractories which are highly impervious to slag penetration and which are quickly and cheaply formed.

My process may also be advantageously applied to the making of abrasive bodies, such as abrasive wheels.

While it is most convenient to use the follower ram above the mixture in the mold, a hydraulic ram equipped with a check valve or instantaneously operating clutch might be placed below the mixture and suitable retaining means used above the mixture. In such an arrangement the underlying ram takes up a certain amount of rebound which occurs after the jolting stroke. Similarly, hydraulic rams may be placed both above and below the mixture being formed, this arrangement being particularly advantageous where long electrodes of high density are required.

It is to be understood, therefore, that while I have illustrated and described the preferred embodiment of my invention, the invention is not so limited but may be otherwise embodied and practiced within the scope of the following claims.

I claim:

1. A machine for molding by jolting, comprising a mold, means for jolting the mold, a follower operating against the material in the mold, and means for applying fluid pressure to the follower.

2. A machine for molding by jolting, comprising a mold, means for jolting the mold, a follower operating against the material in the mold, means for applying fluid pressure to the follower, and means for preventing recession of the follower.

3. A machine for molding by jolting, comprising a mold, means for jolting the mold, a hydraulic follower operating against the material in the mold, means for supplying fluid pressure to the follower, and a check valve in said fluid supply means.

4. A machine for molding by jolting, comprising a mold, means for jolting the mold, a hydraulic head secured to the mold and having a pressure chamber and a ram for bearing upon the material in the mold, connections for supplying a liquid under pressure to the chamber, and a check valve in the liquid supply connection.

5. A machine for molding by jolting, comprising a mold, means for jolting the mold, a follower operating against the material in the mold, and means for positively preventing rebound of the follower.

6. A machine for molding by jolting, comprising a mold, means for jolting the mold, a hydraulic follower operating against the material in the mold, means for supplying oil under pressure in the follower, and a check valve in the oil supply means.

7. A machine for molding by jolting, comprising a mold, means for jolting the mold, a follower operating against the material in the mold, and instantaneously acting means for resisting the tendency to rebound of the follower.

In testimony whereof I have hereunto set my hand.

SEMMEON M. McANULTY.